United States Patent [19]
Adamson, Jr.

[11] 3,834,812
[45] Sept. 10, 1974

[54] OSCILLOSCOPE CAMERA 35MM FILM RECORDER ADAPTER

[75] Inventor: James R. Adamson, Jr., Alexandria, Va.

[73] Assignee: The United States of America as represented by the Secretary of the Navy, Washington, D.C.

[22] Filed: Nov. 23, 1973

[21] Appl. No.: 418,802

[52] U.S. Cl. .................................. 355/46, 95/18
[51] Int. Cl. ........................................ G01d 9/42
[58] Field of Search ............... 355/20, 46; 346/110; 95/18

[56] References Cited
UNITED STATES PATENTS

| | | |
|---|---|---|
| 2,042,983 | 6/1936 | Fairchild .................................. 95/18 |
| 2,483,147 | 9/1949 | Mol ...................................... 355/20 |
| 3,149,903 | 9/1964 | Merrick .............................. 346/110 |

*Primary Examiner*—John M. Horan
*Attorney, Agent, or Firm*—Eugene E. Stevens, III

[57] ABSTRACT

A camera adapter for mounting a 25mm camera on an oscilloscope camera hood. An arm member secures the 35mm camera thereon with a sleeve-like member securing the adapter to the oscilloscope camera viewing hood. A ball detent retainer permits the camera mounted on the arm to be swung aside for viewing, or locked into picture-taking position. The 35mm camera is actuated by a cable release and a rotary solenoid which is synchronized with the electronic shutter of the scope camera.

1 Claim, 2 Drawing Figures

PATENTED SEP 10 1974 3,834,812

OSCILLOSCOPE CAMERA 35MM FILM RECORDER ADAPTER

The invention described herein may be manufactured, used, and licensed by or for the Government for governmental purposes without the payment to me of any royalty thereon.

BACKGROUND OF INVENTION

Film strips for reader recorders are normally made with 35mm film. It is often desirable to make such 35mm film recordings of cathode ray tube imagery from oscilloscopes or thermoscopes at the same time that an instant print photographic record, such as a Polaroid picture, is being made. To accomplish this, it was necessary to design an adapter mounting device for the 35mm camera that would not interfere with the normal operation of the instant print scope camera.

SUMMARY OF INVENTION

The present invention provides simultaneous 35mm film recording and an instant print picture record of CRT imagery. A mounting arm and camera lens mount sleeve which comprise the adapter can be quickly interfaced with a scope camera such as a Tektronix Oscilloscope Camera Model C–12. The mounting adapter incorporates a swing-away hinged arrangement and ball detent retainer so that the oscilloscope face may be viewed through the viewing hood in the usual manner.

DESCRIPTION OF THE PREFERRED EMBODIMENT

Figure 1:
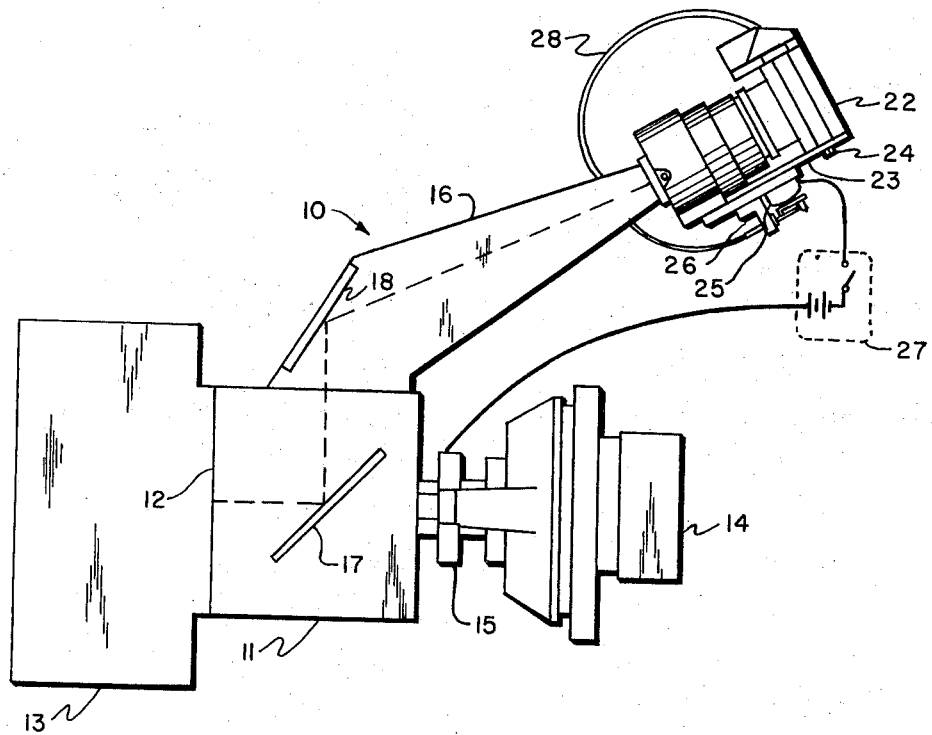
FIG. 1 is a side view of the adapter device and 35mm camera mounted on a typical oscilloscope camera.

The scope camera 10, to which the adapter disclosed herein is affixed, is shown in FIG. 1. The scope camera body 11 which can be attached to the face 12 of an oscilloscope 13 carries an instant picture camera 14 and has an electronic shutter 15. A viewing hood 16 is normally used to observe the information being displayed on the scope. To accomplish this simultaneous viewing and recording, a beamsplitter 17 in the body 11 of the scope camera splits the incoming image from the scope 13 and reflects a portion of the incoming image radiant energy up to a reflector 18 which directs the image along a path through the viewing hood 16. The adapter 21 of the instant invention, mounted on the viewing hood supports the 35mm camera 22 on support arm 23 and is fixed thereto by retaining means such as a screw 24. A rotary solenoid 25 is held by a bracket 26 which is affixed to the arm 23 or fixed at some other convenient location. The rotary solenoid, activated by an energizing and synchronizing device 27 that also triggers the electronic shutter 15, trips the shutter of the camera 22 by actuating a cable release 28.

Figure 2:
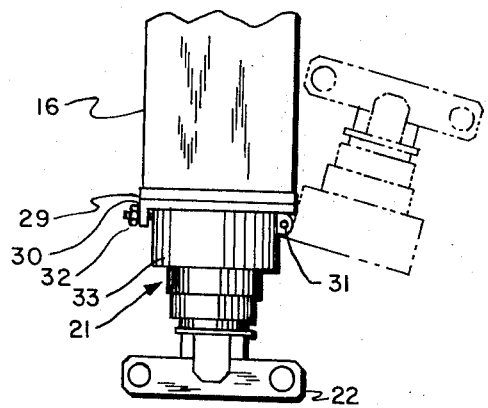
FIG. 2 shows a top view of the 35mm camera on the scope camera hood in picture taking position and in swung-away position in phantom outline.

The adapter 21 can be seen in top view in FIG. 2. A rectangular frame consisting of two hinged members 29 and 30 mounts the adapter to the viewing hood 16. The member 29 slips over the viewing hood and is fixed thereto. Member 30 is hinged to member 29 by hinge means 31 thus allowing the camera 22 to be swung away, as shown in the phantom sketch of FIG. 2, for viewing the scope face. A ball detent retainer 32 locks the members 29 and 30 in a closed picture taking position. A cylindrical sleeve 33 coextensive with the frame member 30 receives the lens mount of the 35mm camera 22 in a substantially light tight manner. Thus, 35mm film record can quickly be made without interference with the scope camera.

While only one embodiment of the invention has been disclosed, it is to be understood that many variations, substitutions and alterations may be made while remaining within the spirit and scope of the invention which is limited only by the following claims.

I claim:

1. An adapter device for mounting a 35mm film camera to the viewing hood of a scope camera and for synchronizing the electronic shutter of the scope camera and the shutter of the 35mm camera, and comprising:

a first substantially rectangular frame member with means for fixing said member to the viewing hood of said scope camera;

a second substantially identical rectangular frame member hinged to said first frame member at one side;

locking means associated with said first and second frame members for holding them in a closed position;

a cylindrical tube coextensive with and affixed to said second frame member;

a camera support arm fixed to said cylindrical sleeve and having fastening means thereon for securing the 35mm camera thereto;

a solenoid release associated with said adapter for actuating a cable release to trip the shutter of said 35mm camera; and means operatively associated with said solenoid and said electronic shutter for providing simultaneous electrical activating pulses thereto.

* * * * *

UNITED STATES PATENT OFFICE
CERTIFICATE OF CORRECTION

Patent No. 3,834,812     Dated September 10, 1974

Inventor(s) James R. Adamson, Jr.

It is certified that error appears in the above-identified patent and that said Letters Patent are hereby corrected as shown below:

On the front page, data element "/73/ Assignee: The United States of America as represented by the Secretary of the Navy" should read -- /73/ Assignee: The United States of America as represented by the Secretary of the Army--.

Signed and sealed this 3rd day of December 1974.

(SEAL)
Attest:

McCOY M. GIBSON JR.
Attesting Officer

C. MARSHALL DANN
Commissioner of Patents